March 2, 1971  J. W. ASHMORE  3,566,583
APPARATUS FOR PURIFYING EXHAUST FUMES
Filed Jan. 29, 1969
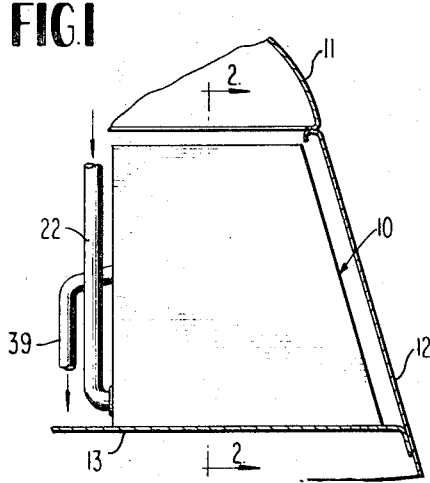
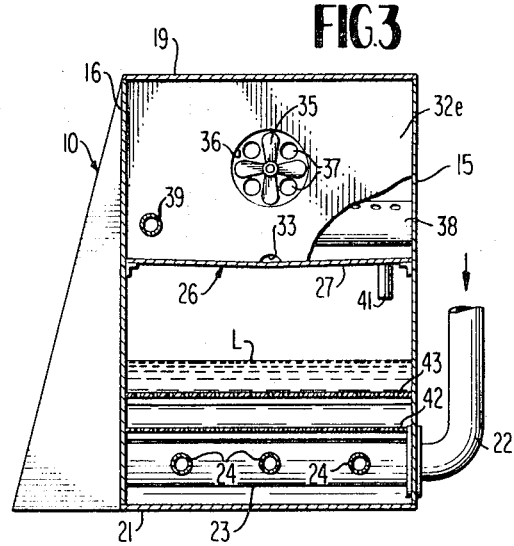
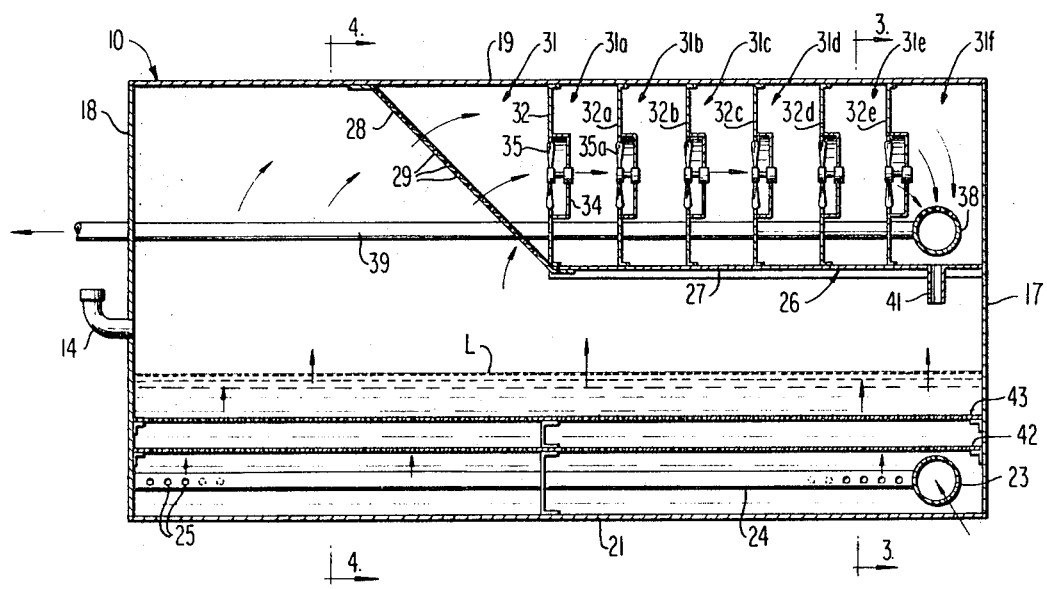
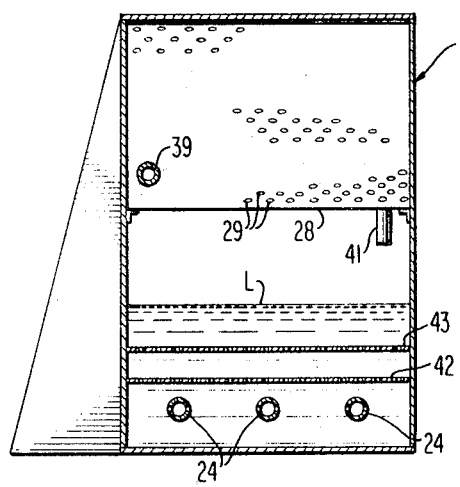
INVENTOR
JOHN W. ASHMORE
BY Watson, Cole, Grindle & Watson
ATTORNEYS 3,566,583
Patented Mar. 2, 1971

3,566,583
APPARATUS FOR PURIFYING EXHAUST FUMES
John W. Ashmore, 13431 Budlong,
Gardena, Calif. 90249
Filed Jan. 29, 1969, Ser. No. 794,907
Int. Cl. B01d *47/02*
U.S. Cl. 55—255                                 5 Claims

ABSTRACT OF THE DISCLOSURE

An apparatus for removing impurities from the exhaust of internal combustion engines wherein the exhaust gas is fed directly into a liquid solution after which water vapor carried by the cleaned exhaust gas is extracted before discharge thereby avoiding any substantial reduction of liquid supply within the apparatus. Complete water vapor extraction is insured by passing the cleaned exhaust fumes sequentially through a series of condensation chambers.

---

This invention relates generally to an anti-smog apparatus for internal combustion engines and more particularly to a device for removing toxic or lethal gases from the exhaust fumes before being discharged into the atmosphere.

Currently, there are many types of anti-smog devices in the form of mufflers or other types of apparatus for the purpose of removing the objectional products of combustion from the exhaust gas of internal combustion engines. Many of these devices, however, are somewhat complex in their design and have been found to substantially reduce the efficiency of such engines without removing a sufficient amount of impurities from the exhaust fumes so as to render the exhaust non-toxic before being liberated to the atmosphere. It is therefore an object of the present invention to provide an apparatus for eliminating the poisonous carbon monoxide and other complete and incomplete products of combustion from the exhaust gas of an internal combustion engine before discharge into the atmosphere in a manner which is more economical, simple in design, easy to manufacture and efficient in its operation without any significant reduction in the operating efficiency of the internal combustion engine.

Another object of the present design is to provide such an apparatus which is capable of being easily installed in a motor vehicle within a relatively confined area.

A further object of the invention is to provide an apparatus for effectively removing the toxic impurities from the exhaust of internal combustion engines by means of feeding the gas directly into a liquid solution after which any water vapor carried by the exhaust gas is extracted, in a novel manner, before discharge from the apparatus thereby preventing any substantial reduction of the supply of liquid within the apparatus.

A still further object of the invention is to provide an anti-smog apparatus comprising an enclosed tank partially filled with a liquid solution, pipe means for directing the exhaust fumes into the tank below the water level, the pipe means acting also to distribute the exhaust fumes within the liquid, an enclosed compartment within the upper portion of the tank, the compartment having a series of chambers therein so that any water vapor carried by the exhaust gas may be extracted by condensation as the clean exaust gas is directed through each chamber, and exhaust gas outlet pipes within the compartment for directing the clean exhaust gas to the exterior of the tank.

A still further object of the instant invention is to provide an apparatus of the character described wherein each chamber is defined by a baffle plate each having a rotatable fan therein for assisting movement of the clean exhaust gas through each chamber thereby acting to further extract water vapor from the clean exhaust gas as the vapor condenses on each moving blade.

Other objects, advantages and novel features of the invention will become apparent from the following detailed description of the invention when considered in conjunction with accompanying drawings wherein:

FIG. 1 is an end view of the apparatus according to the invention shown in its relation to the trunk compartment of a motor vehicle;

FIG. 2 is a longitudinal vertical section taken at line 2—2 of FIG. 1 showing the movement of exhaust gas through the apparatus;

FIGS. 3 and 4 are transverse views in vertical section taken substantially along the lines 3—3 and 4—4, respectively, of FIG. 2.

Turning now to the drawings wherein like reference characters refer to like and corresponding parts throughout the several views,there is shown in FIG. 1 the filtering apparatus or anti-smog device 10 in accordance with the present invention shown in its relation to interior walls 11, 12 and 13 of a motor vehicle which may define trunk walls of an automobile. Of course, the apparatus could be easily mounted within some other portion of the motor vehicle without detracting from the spirit of the present invention.

The apparatus, FIGS. 2 and 3, comprises a substantially enclosed tank defined by side walls 15 and 16, end walls 17 and 18, a top wall 19 and a bottom wall 21. An inlet pipe 22, mounted on side wall 15 and extending toward side wall 16, is provided for admitting exhaust gas into the apparatus from an exhaust pipe (not shown). A section 23 of the pipe 22 is submerged below the level of a quantity of liquid L which partially fills the enclosed tank, as shown. The tank may be filled through a capped inlet port 14 conveniently located on end wall 18. A number of open-ended conduits 24 are mounted at one end to end wall 18 and are connected at their other ends to the pipe section 23 through suitable apertures provided for the purpose. In this way, the exhaust gas is admitted to the tank through the pipe section 23 and is distributed throughout the length of the tank by means of conduits 24. In order for the exhaust fumes to be discharged through the liquid, each of the conduits 24 is provided with a suitable number of perforations 25 along its length. Accordingly, the exhaust fumes may be filtered through the liquid L and rise upwardly within the tank, in the direction of the arrows, as clean exhaust air substantially removed of toxic or lethal gases absorbed by the liquid. Because the cleansed fumes emanating from the liquid may be carrying water vapor in suspension, a small quantity of liquid would be discharged from the tank if such fumes were to be directly emitted from the tank immediately after passing through the liquid. Therefore, in order to conserve the quantity of liquid within the tank, the invention contemplates a means for extracting the water vapor from the clean exhaust gas before being discharged to the atmosphere. Such a means comprises a compartment 26 mounted within the top portion of the tank and having a bottom wall 27 and a sloping end wall 28. The clean exhaust gas is admitted into the compartment 26 through perforations 29 provided in the wall 28 and is confined substantially within a first chamber 31. A baffle plate 32 is mounted within the compartment, as shown, for acting as a condensation barrier for the water vapor held in suspension by the clean exhaust fumes. Accordingly, water vapor will condense onto the plate 32 thereby forming water droplets which fall toward the bottom wall 27 and enter a second chamber 31a through a drain hole 33 provided in the baffle plate as shown in FIG. 3 of the drawings. Also, it can be seen in FIG. 3 that bottom wall 27 slopes downwardly toward drain hole 33 so that the water droplets may more easily travel between chambers. A back-up mounting plate 34 is provided on the baffle plates for rotatably mounting a fan 35 within a baffle aperture 36. A plurality of apertures 37 are provided in each back-up plate 34 for admitting the clean exhaust fumes from the chamber 31 into the chamber 31a. These fumes, also containing water vapor but to a lesser extent, will be assisted in their travel from chamber 31 to chamber 31a by means of the fan 35 rotating on its mount 34 as the exhaust fumes pass therethrough. In addition, some water vapor will condense on the blades of fan 35 and be thereafter released by centrifugal force as the fan rotates. In this way, the condensed vapor may be more rapidly removed from chamber 31 toward chamber 31a.

Any additional water vapor carried in suspension by the cleaned exhaust fumes contained within chamber 31a is similarly extracted by condensation on the baffle plate 32a. A fan 35a is mounted on baffle plate 32a in the identical manner and for the same purpose as described with reference to fan 35 and baffle plate 32. Accordingly, it can be seen that a quantity of water vapor is extracted as the clean exhaust fumes pass from chamber 31 and subsequently through each of the remaining chambers 31a–31f so that substantially all the water vapor is condensed on the plates 32–32e during its travel through the longitudinally aligned chambers. It should be noted that each of the baffle plates 32 through 32e are constructed in a manner identical to that described with reference to baffle plate 32, that is, each is provided with a drain aperture 33 and a cutout portion 36 for the fan 35. Also each of the baffle plates makes use of a back-up mounting plate 34, as described earlier, having apertures 37 therein for permitting a flow of clean exhaust gas from one chamber to another. Also, it should be pointed out that the back-up plate 34 can be mounted on each baffle either by means of a peripheral flange as shown in FIG. 2 or by means of merely upper and lower flanges, if desired. In any event, when the flow of clean exhaust gas reaches the chamber 31f, it will be substantially free of water vapor so that it may be conveniently vented to the exterior of the apparatus. For this purpose, a perforated outlet header section 38 is provided to which is connected an outlet discharge pipe 39 for directing the dry exhaust air to the atmosphere.

In order to drain the condensed water vapor from the compartment 26, a drain pipe 41 is provided in bottom wall 27 within the chamber 31f for returning the collected water vapor to the liquid in the tank after passing through apertures 33 in each of the chambers.

During any swaying or other abrupt motion of the moving vehicle, it is desirable to maintain a constant level of liquid within the tank. Accordingly, a pair of perforated plates 42 and 43 are provided a slight distance above the conduits 24 and submerged well below the level of the liquid, as shown in the drawings. In this way, any likelihood of exposure of any of the conduits 24 as the liquid is displaced is substantially avoided.

Although no mention has been made of the specific type of absorbing medium contemplated for the liquid L, it should be recognized that a solution of ordinary baking soda, that is, sodium bicarbonate, has been proven to be sufficiently adequate for the purpose of absorbing the poisonous carbon monoxide and complete and incomplete products of combustion from the exhaust gas of the internal combustion engine.

Also, it is to be noted that a heat exchanger may be provided on the exhaust pipe for the purpose of cooling the exhaust before entering the apparatus 10.

From the foregoing, it is obvious that a novel apparatus has been designed for removing carbon monoxide and other impurities from the exhaust of internal combustion engines wherein a highly effective absorbing solution is used in a simple manner for purifying the exhaust before entering the atmosphere. In addition, the apparatus contains a means for extracting water vapor from the clean exhaust fumes emanating from the liquid solution, such a means being in the form of a series of baffles forming a plurality of chambers longitudinally aligned so that any water vapor suspended in the emanating exhaust fumes is extracted by condensation on each of the baffles as the exhaust passes from one chamber to the next. The clean exhaust fumes are not vented from the interior of the apparatus until they reach the final chamber. Accordingly, only a small insignificant amount of water vapor will be discharged to the exterior of the apparatus so that depreciation of the liquid content within the apparatus will be held to a minimum.

Obviously, many modifications and variations of the present invention are possible in the light of the above teachings. It is therefore to be understood that within the scope of the appended claims the invention may be practiced otherwise than as specifically described.

What is claimed is:

1. An apparatus for removing impurities from the exhaust fumes of internal combustion engines comprising:
an enclosed tank partially filled with a quantity of purifying liquid;
exhaust gas inlet means secured to one wall of said tank below the level of liquid contained therein, a portion of said inlet means terminating within said tank below the liquid level;
at least one inlet conduit within said tank below the liquid level connected to said inlet means portion for distributing the exhaust gas throughout said liquid, said conduit having perforations along its length for allowing the exhaust gas to be discharged directly through the liquid and upwardly within said tank substantially free of impurities;
an enclosed compartment mounted within the upper portion of said tank, one end of said compartment being perforated for admitting the clean exhaust gas therein;
baffle means mounted within said compartment for extracting, by condensation thereon, any water vapor carried by the clean exhaust gas;
fans mounted on said baffle means for further extracting, by condensation thereon, the water vapor from the clean exhaust gas;
each of said fans being mounted for rotation thereby assisting the clean exhaust gas to pass therethrough as it rotates;
means for draining the condensed water vapor toward said liquid; and
exhaust gas outlet means within said compartment for directing the clean exhaust gas to the exterior of said tank.

2. The apparatus according to claim 1 wherein said inlet means portion comprises a header tube and wherein a plurality of said inlet conduits are provided, each said conduit having perforations along its length and each being connected to said header tube for more evenly distributing the exhaust gas throughout said liquid.

3. The apparatus according to claim 2 wherein said baffle means comprises a plurality of baffle plates spaced along the length of said compartment thereby forming a number of longitudinally aligned chambers, said compartment perforated end being located ahead of the first of said chambers and said exhaust gas outlet means extending from the last of said chambers to the exterior of said tank, whereby the clean exhaust gas must travel through each of said chambers before being directed to the exterior of said tank.

4. The apparatus according to claim 3 wherein each of said baffle plates are apertured at their lower ends, and the bottom wall of said compartment is apertured thereby constituting said drain means for the condensed water vapor.

5. The apparatus according to claim 4 wherein said outlet means comprises a perforated header pipe located within said last chamber, and further comprises an outlet conduit connected to said header pipe.

References Cited

UNITED STATES PATENTS

| | | | |
|---|---|---|---|
| 3,350,877 | 11/1967 | Bowman | 60—30L |
| 3,480,263 | 11/1969 | Davidson | 55—229X |

TIM R. MILES, Primary Examiner

S. H. MARKOWITZ, Assistant Examiner

U.S. Cl. X.R.

55—256, 257, 403, 406; 60—30; 261—122, 124